May 23, 1967 S. M. K. HORNE ET AL 3,321,580

HANDS-FREE COMMUNICATION SYSTEMS INCLUDING PRIVACY FEATURES

Filed Dec. 20, 1963

4 Sheets-Sheet 1

INVENTORS
SYDNEY M.K. HORNE
JOHN L. HANNA
CORNELIS W. REEDYK
BY: Curphey & Erickson
PATENT AGENTS

HANDS-FREE COMMUNICATION SYSTEMS INCLUDING PRIVACY FEATURES

Filed Dec. 20, 1963

INVENTORS
SYDNEY M.K. HORNE
JOHN L. HANNA
CORNELIS W. REEDYK
BY: Curphey & Erickson
PATENT AGENTS INVENTORS
SYDNEY M.K. HORNE
JOHN L. HANNA
CORNELIS W. REEDYK
BY: [signature]
PATENT AGENTS

INVENTORS
SYDNEY M. K. HORNE
JOHN L. HANNA
CORNELIS W. REEDYK
BY.
PATENT AGENTS

United States Patent Office 3,321,580
Patented May 23, 1967

3,321,580
HANDS-FREE COMMUNICATION SYSTEMS INCLUDING PRIVACY FEATURES

Sydney M. K. Horne, John Lewis Hanna, and Cornelis W. Reedyk, Ottawa, Ontario, Canada, assignors to Northern Electric Company Limited, Montreal, Quebec, Canada Filed Dec. 20, 1963, Ser. No. 332,021
22 Claims. (Cl. 179—1)

This invention relates to communication systems and has particular application in hands-free loudspeaker intercommunication systems.

In known communication systems employing a microphone, a voice communication channel and a loudspeaker, an audible alerting signal is often generated and applied to the loudspeaker when a call is originated at the microphone. In such a typical system, two wires were used for the communication channel and a third wire together with one of the wires used for the communication channel were employed for transmitting the signal. In the case where a person at the loudspeaker wished to have privacy, a switch was provided to open-circuit the voice communication wire which was not associated with the transmission of the signal, thereby permitting only the alerting signal to be heard. However, such a system suffered from the disadvantage of always requiring the third wire. This disadvantage has proved to be quite serious in two-way intercommunication systems where the switching equipment used for interconnecting a number of stations was limited in the number of wired connections it could efficiently and economically accommodate. For example, intercommunication systems using crossbar switches in the switching equipment are limited to a certain number of wires per cross-point. Therefore, intercommunication systems that required additional wires for privacy purposes lacked features which otherwise would have been desirable.

To further illustrate the shortcomings of the prior art a typical hands-free intercommunication system will be considered. A call is usually initiated at a station by depressing the station selection key assigned to the station being called. This operates the remote switching equipment which connects the calling station's microphone and loudspeaker to one end of a two-way voice communication channel. In addition, depression of the station selection key causes address information to be transmitted to the switching equipment which connects the station being called to the other end of the same two-way voice communication channel. Once this connection between the calling and called stations is made, the switching equipment automatically energizes a signal tone generator and a signal tone of predetermined duration is transmitted over the communication channel from the switching equipment to the called station's loudspeaker. The duration of the tone is controlled by a simple timing circuit. In a system as thus described, hands-free intercommunication would immediately be established in both directions of transmission.

It is often desirable, however, for each station to be equipped with a choice of preselected means for receiving an incoming call which would permit various degrees of privacy. Prior to this invention, as far as applicants are aware, known intercommunication systems had only one privacy feature. This was to permit each station to preselect its equipment in such a manner that when a call was initiated at a calling station, the called station would receive a signal tone, immediately followed by the establishment of voice communication in the direction from the calling station to the called station but not in the direction from the called station to the calling station. Such a privacy feature would permit someone at a calling station to give messages or instructions to someone at a called station without the latter having to reply. Furthermore, this feature prevented someone at a calling station from eavesdropping on someone at a called station in the case where the latter was already talking to someone else in the immediate area and did not hear the signal tone. However, this feature had the serious disadvantage of not providing any means for someone at the called station to shut off someone talking at the calling station.

The prior art hands-free intercommunication systems of which applicants are aware did not have the additional privacy feature whereby a called station could receive a signal tone but voice communication would be prevented in the direction from the calling station to the called station, until someone at the called station answered the call. The provision of such a feature was thought to be impracticable, prior to applicants' invention, because the voice signals and the signal tone were usually transmitted over the same communication channel to the loudspeaker.

Applicants have overcome these disadvantages of the prior art by providing a communication system in which voice signals at a microphone and a signal tone generated at the switching equipment can both be transmitted over the same voice communication channel to a loudspeaker at a station being called. In addition, when privacy is desired, the signal tone can be transmitted over the voice communication channel to the loudspeaker at the station being called but voice signals are prevented from being heard over the same loudspeaker until someone answers the call.

According to applicants' invention, a communication system is provided comprising a microphone, a loudspeaker and a voice communication channel for connecting the microphone to the loudspeaker. An audible signal generating means is connected to the voice communication channel and is arranged, when energized, to transmit a signal tone of predetermined duration over the communication channel to the loudspeaker. Conventional switching means are provided and arranged, when energized by the origination of a call at the microphone, to connect the microphone and the loudspeaker to the voice communication channel and to energize the audible signal generating means. The voice communication channel is arranged to permit voice signals at a microphone to be heard over the loudspeaker when a first predetermined control signal is applied to the channel and to prevent voice signals at the microphone from being heard over the loudspeaker when a second predetermined control signal is applied to the channel. Control signal generating means are provided for generating the control signals and for applying one or the other of the control signals to the voice communication channel. A switch is provided at the loudspeaker for conditioning the control signal generating means to apply a predetermined one or the other of the control signals to the voice communication channel.

Preferably, the voice communication channel comprises an attentuation device and a fixed gain amplifier serially connected together. The attenuation device may be coupled to the input or the output of the amplifier as desired. In the former case the audible signal would be connected to the input of the amplifier and in the latter case, to the output of the attenuation device. The attenuation device is arranged to produce attenuation in an amount so as to permit voice signals at the microphone to be heard over the loudspeaker in response to the first control signal and to produce attenuation sufficient to prevent voice signals from being heard over the loudspeaker in response to the second control signal.

Where the type of switching equipment used poses a limitation on the number of wires which can be connected from a station to the switching equipment, the switch at the loudspeaker can be advantageously connected via a phantom circuit over the loudspeaker leads.

Known hands-free intercommunication systems provide automatically controlled, two-way voice communication channels for alternate transmission of voice signals in two directions. In such systems, the voice communication channel is usually arranged to alternately permit voice signals to be heard over only one loudspeaker at a time in response to a first or second control signal applied to the channel. To accomplish this, a control signal generating means is usually arranged to be responsive to the relative amplitude of the voice signals originating at each microphone to produce the first or second control signal depending on which voice signal has the higher amplitude. These control signals are then applied to the communication channel. Such a control means is described in copending U.S. application Ser. No. 280,403, filed on May 14, 1963 (now U.S. Patent 3,287,507, issued Nov. 22, 1966), in the name of G. J. Overtveld and assigned to the assignee of this invention. In addition, an alerting signal tone is generated and transmitted over the communication channel to the loudspeaker of the station being called.

Applicants have improved upon such an intercommunication system to provide advantageous privacy features at each station. According to their invention, applicants have provided circuit means arranged, when energized, to override the response of the control signal generating means to the voice signals and to so condition the control signal generating means to apply a predetermined one or the other of the control signals to the channel. A privacy switch is provided at each station and is connected to the circuit means through the switching equipment whenever the station is called. Each switch has preselected first, second and third positions of operation. Each switch is arranged, when in its first position, to energize the circuit means when the station is called, and to prevent signal transmission from the microphone circuit at that station. The circuit means conditions the control signal generatitng means to apply the control signal which will cause the channel to prevent voice signals from being heard over the loudspeaker of the station being called. At the same time, however, the voice communication channel is arranged to permit the signal tone to be transmitted thereover to the loudspeaker of the station being called. This provides what is known as "signal" calling.

The switch is arranged, when in its second position, to be disconnected from the circuit means but still to prevent signal transmission from the microphone circuit. This feature is known as "voice" calling. The switch is arranged, when in its third position, to be disconnected from both the circuit means and the microphone circuit. Thus, when the switch is in its third position, "hands-free" calling is provided once two stations have been connected.

In prior art intercommuncition systems, someone at a calling station had to set the privacy switch at that station to the hands-free position prior to originating a call. Furthermore, a call could be released only at a calling station and someone at the calling and called station had to reset their respective privacy switch after a call was released at the calling station.

Answering means are provided at each station, according to applicants' invention, which is arranged, when activated at a station being called, to effectively place the switch in its third or hands-free position. Further means are provided at each station which is arranged, when activated by the placing of a call at a calling station, to effectively place the switch in its third or hands-free position. Thus, regardless of what position the switch is in at either station, the placing of a call at one station and the activation of the answering means at the other station automatically provides for "hands-free" intercommunication.

Release means are provided under control of a calling or called station, according to another aspect of applicants' invention, to deenergize the switching means thereby releasing a call, and to effectively return the privacy switch at each station to its preselected position. Thus, it can be seen that two degrees of privacy are provided on a preselected basis which can be overridden to provide "hands-free" communication for the duration of a call after which the preselected degree of privacy is automatically re-established.

Again, where the switching equipment poses a limitation on the number of leads which can be connected from each station to the switching equipment, the switch at each station can be advantageously connected to the circuit means at the switching equipment via a phantom circuit over the microphone leads and the release means can be connected to the switching equipment via a phantom circuit over the loudspeaker leads.

Preferred embodiments of applicants' invention will now be described, by way of example, with reference to the accompanying drawings where like characters are used to identify like parts and in which.

Figure 1:
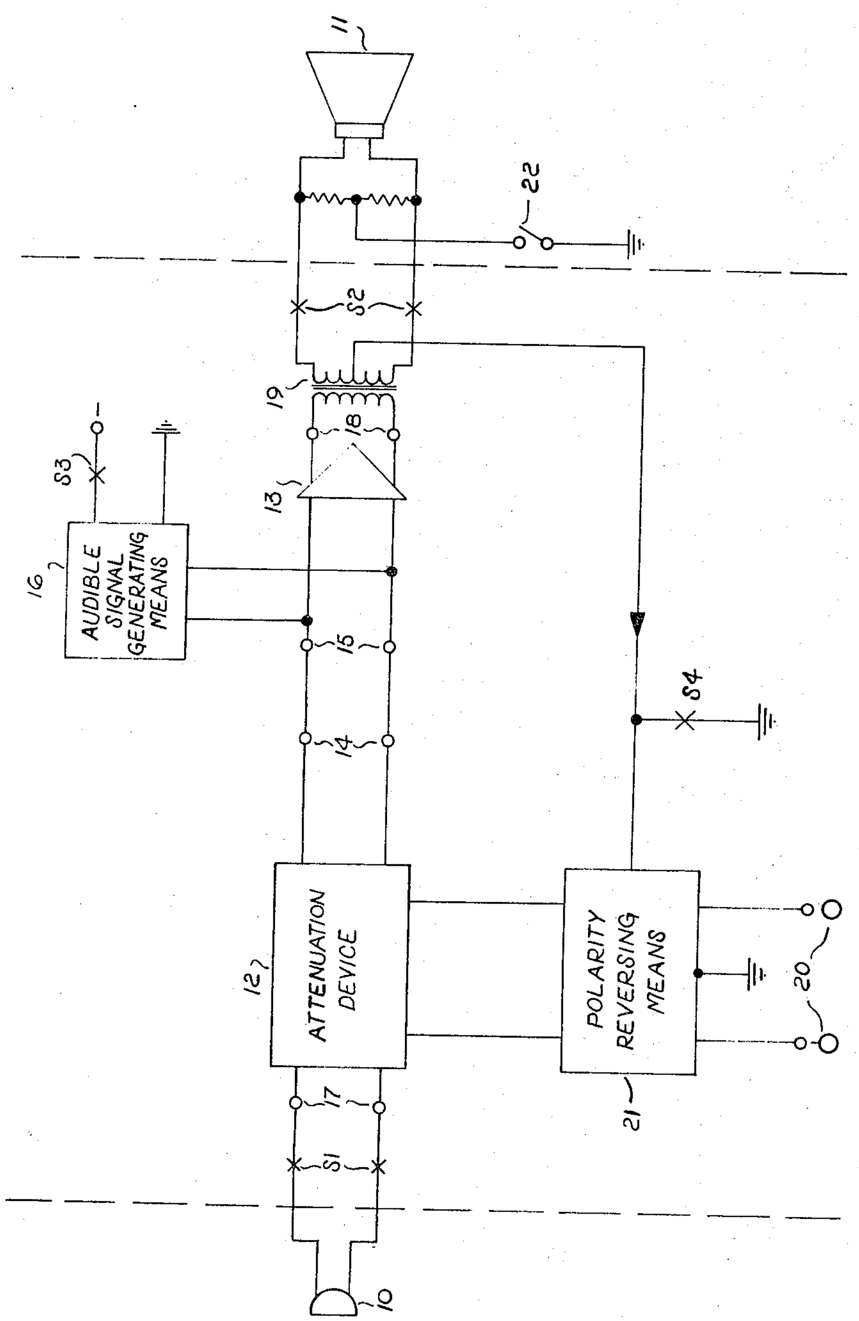
FIG. 1 is a block schematic diagram of one channel of a communication system illustrating the invention in its broadest sense.

Referring to the drawings, FIG. 1 illustrates the invention in its broadest sense. A microphone 10 is arranged to be connected to a loudspeaker 11 through a voice communication channel shown as an attenuation device 12 and a fixed gain amplifier 13. The output 14 of the attenuating device 12 is connected to the input 15 of the amplifier 13. An audible signal generating means 16 is connected to the input 15 of the amplifier 13 and is arranged, when energized, to transmit a signal tone over the amplifier 13 to the loudspeaker 11. Conventional switching means shown as make contacts S1 and S2 are arranged, when energized by the origination of a call at the microphone 10, to connect the microphone 10 to the input 17 of the attenuation device and to connect the loudspeaker 11 to the output 18 of the amplifier 13 through a coupling transformer 19. With this connection made, the generating means 16 is energized through make contact S3 and signal tone is heard over the loudspeaker 11. The attenuation device 12 is arranged, as will be described in more detail hereinafter, to present minimum attenuation, thereby permitting voice signals at the microphone 10 to be heard over the loudspeaker 11 when a first predetermined control signal is applied to the device 12 and to present maximum attenuation, thereby preventing voice signals at the microphone 10 from being heard over the loudspeaker 11 when a second predetermined control signal is applied to the device 12. A control signal generating means comprises a source of fixed potential 20 and a polarity reversing means 21 connected between the potential 20 and the attenuation device 12. The potential 20 as shown comprises the first control signal and when reversed, comprises the second control signal. A switch 22 is connected to the polarity reversing means 21 via a phantom circuit between the loudspeaker leads and the secondary of the transformer 19.

In operation, the origination of a call at the microphone 10 energizes the switching means S1 and S2 in a well-known manner to connect the microphone 10 to the loudspeaker 11. With this connection made, the generating means 16 is energized through a make contact S3 of the switching equipment and a signal tone is heard over the loudspeaker 11. While the tone is being generated, a ground is applied through a make contact S4 of the switching equipment to the polarity reversing means 21 to reverse its polarity such that the second control signal is applied to the attenuation device 12. Thus, voice signals are prevented from being heard over the loudspeaker 11 when the signal tone is generated. The switching equipment is arranged, after a predetermined time interval, to open contacts S3 and S4, thereby deenergizing the generating means 16 and permitting the polarity reversing means to return to its normal condition to permit voice signals to be heard over the loudspeaker 11. However, if privacy is required at the loudspeaker, the switch 22 can be preset in its closed position and the polarity reversing means would thus remain in its reversed polarity condition. The call can be answered at the loudspeaker by opening the switch 22 to return the polarity reversing means to its normal condition once again.

Figure 2:
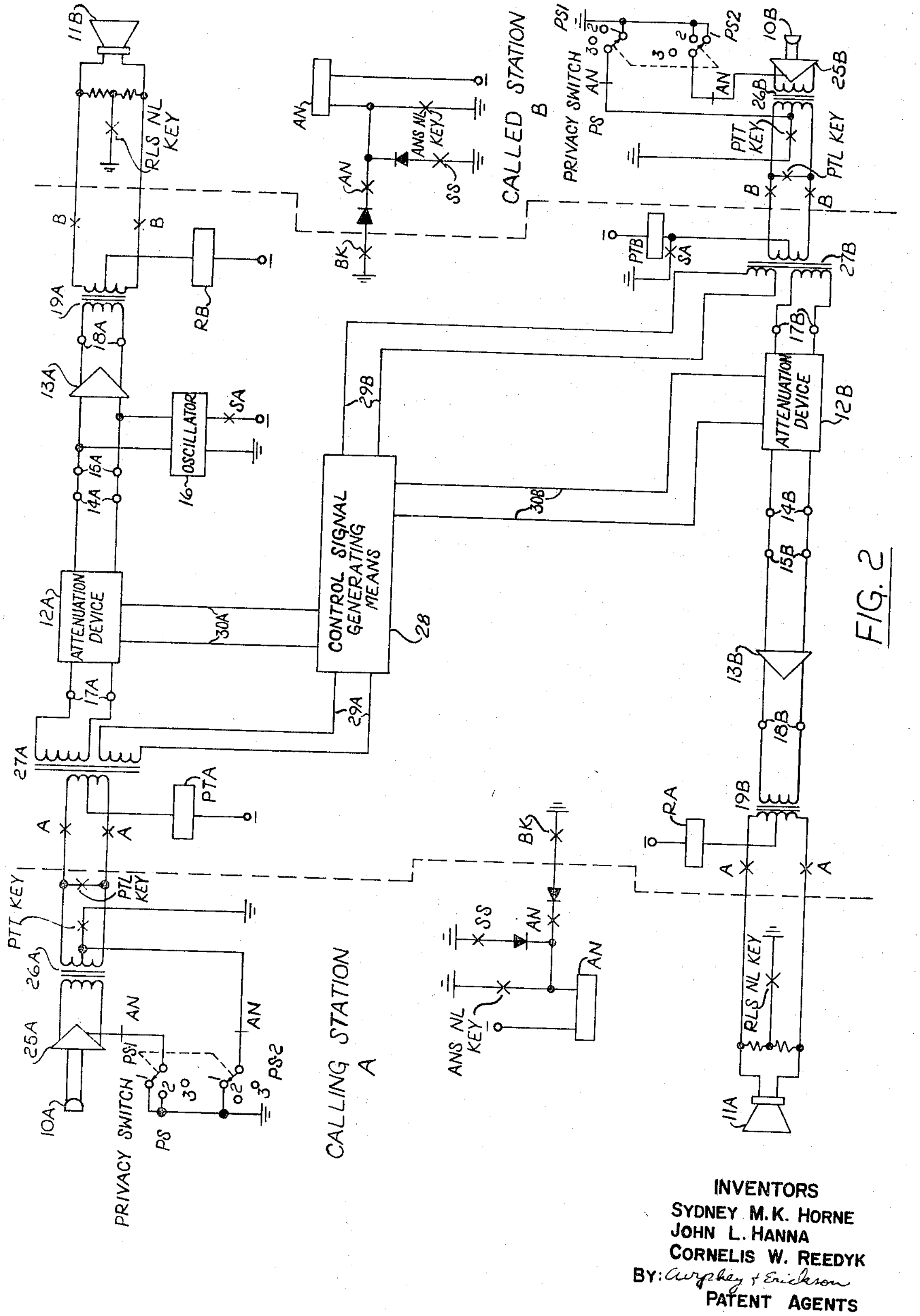
FIG. 2 is a partial block-schematic, partial detached-schematic diagram of a two-way intercommunication system in accordance with applicants' invention.

Referring to FIG. 2, a "hands-free" intercommunication system, according to applicants' invention, will now be described. Two stations A and B are shown and for the purposes of this application, it will be assumed that station A is a calling station and station B is a called station. Each station has a microphone 10 and a loudspeaker 11. At station A, the microphone 10 is connected through a preamplifier 25 and a transformer 26 (serving as a first coupling means) to the make contacts of an A relay associated with the remote switching circuit, and the loudspeaker 11 is coupled to further make contacts of the A relay. At station B, the microphone 10 and the loudspeaker 11 are similarly coupled to the make contacts of the B relay associated with the remote switching circuit. A two-way voice communication channel includes attenuation devices 12 and fixed gain power amplifiers 13 for interconnecting the microphone and loudspeakers of each station. In one direction of transmission an input 17A to the voice communication channel is coupled to the make contacts of the A relay through a transformer 27A (serving as a second coupling means) and an output 18A is coupled to the make contacts of the B relay through a transformer 19A. Input 17B and output 18B are similarly connected for the other direction of transmission. In the embodiment shown, each attenuation device 12 has its output 14 coupled to the input 15 of its associated amplifier 13 and audible signal generating means shown as an oscillator 16 is connected to the input 15A of the amplifier 13A. In the case where the attenuation devices 12 are connected after the amplifiers 13, the oscillator 16 would be connected to the output of the attenuation device 12A. The oscillator 16 is arranged to be energized through a make contact of an SA1 relay associated with the switching circuit.

A portion of the signal appearing at each input 17 is coupled from the tertiary winding of the transformer 27 to a control signal generating means 28 via leads 29. The control signals produced by the generating means 28 are applied to each attenuation device 12 through leads 30 to produce maximum or minimum attenuation alternately in the respective attenuation devices 12. To allow for stability in the system, the intercommunication system is arranged such that the total loop gain from the microphone 10 at one station through the loudspeaker 11 at the other station, including the acoustic coupling from the loudspeaker to the microphone at the other station and back to the loudspeaker at the first mentioned station is always less than unity. When either attenuation device 12 is arranged to present minimum attenuation the gain from its associated microphone to its associated loudspeaker should be substantially greater than unity to permit someone at the loudspeaker to hear the voice signals.

Circuit means shown as relays PTA and PTB have their energization circuits connected to the primary winding of the respective transformers 27. A privacy switch PS having first, second and third positions of operation is provided at each station. The switch blades PS–1 and PS–2 are respectively connected to the final stage of the preamplifier 25 and to the center tap of the secondary winding of the transformer 26. When the PS switch is in its first position, switch blades PS–1 and PS–2 are connected to a ground. When the PS switch is in its second position, switch blade PS–1 is connected to ground and switch blade PS–2 is open circuited. When the PS switch is in its third position, both switch blades PS–1 and PS–2 are open circuited.

A push-to-talk key PTT is connected between the center tap of the secondary of the transformer 26 and ground and a push-to-listen key PTL is connected across the same secondary.

Answering means are provided at each station comprising an answer relay AN and a non-locking answer key ANS connected in the energizing circuit of the relay AN. Once energized by the ANS key, the AN relay is held operated through one of its make contacts and a make contact of a BK relay associated with the switching circuit. A make contact SS, which is multipled to all station selection keys (not shown) for originating calls, provides further means for energizing the AN relay whenever a call is originated at either station.

Release means are provided under control of each station comprising a non-locking release key RLS and an RA or RB relay. The RLS key at station A is connected to the energizing circuit of the RA relay from a ground through a phantom circuit over the loudspeaker leads to the center tap of the secondary of the transformer 19B. The RLS key at station B is similarly connected to the energizing circuit of the RB relay.

*Origination of a call at station A*

Figure 3:
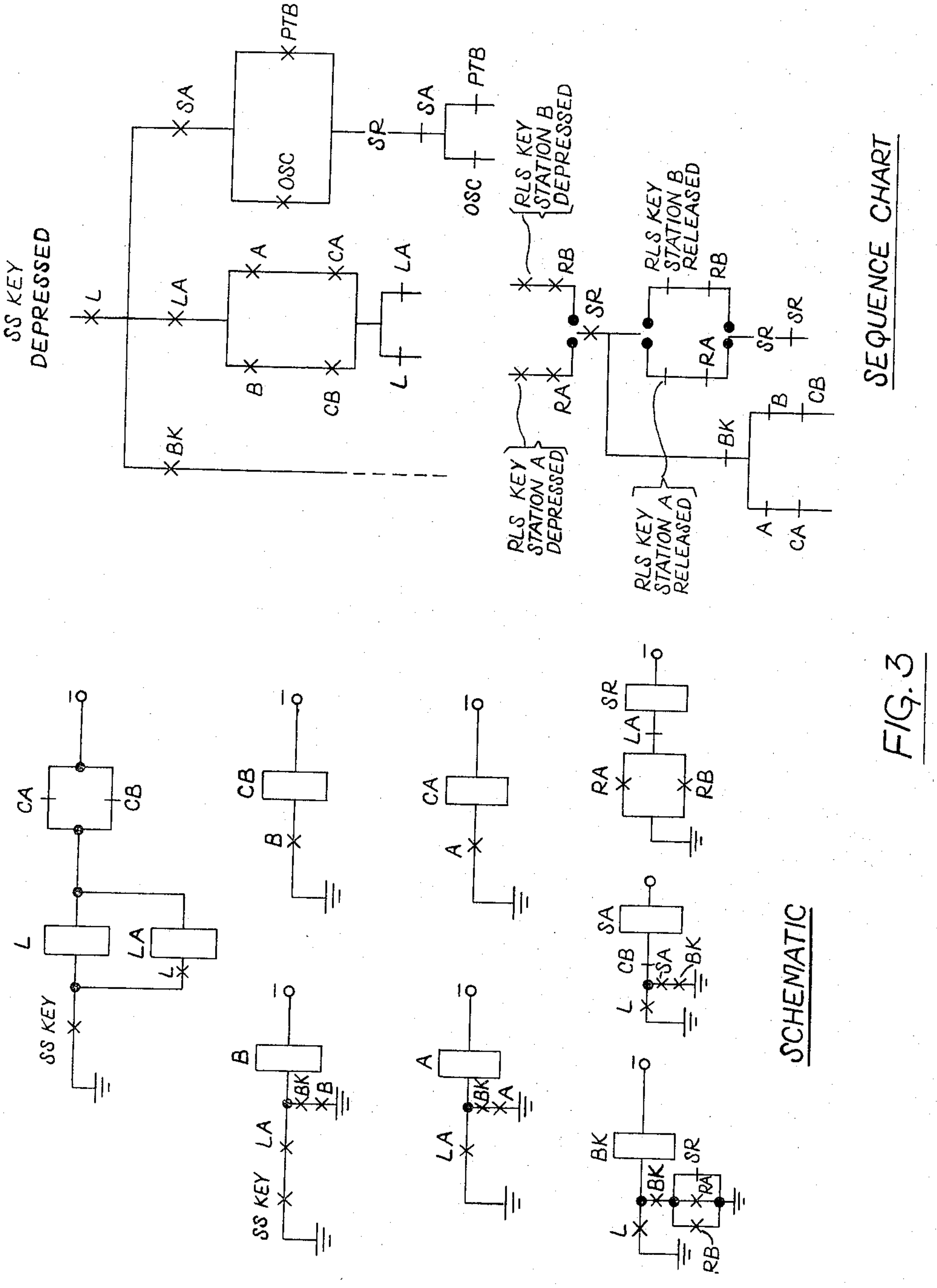
FIG. 3 is a detached schematic diagram showing the circuitry of the remote switching equipment for setting up and releasing a call.

Referring to the circuitry and sequence chart of FIG. 3, the origination of a call at station A will now be described. Depression of the station selection key associated with station B operates the L relay. Operation of the L relay operates the LA, BK and SA relays. The LA relay locks up under control of a ground associated with the SS key. The BK relay locks up under control of a break contact of an SR relay. The SA relay locks up under control of a break contact of a CB relay and a make contact of the BK relay.

Operation of the LA relay operates the A relay which through its make contacts connects station A to the voice communication channel (FIG. 2). The B relay also operates from a ground connected to the depressed SS key associated with station B. Thus, station B is connected to the same voice communication channel through the make contacts of the B relay (FIG. 2).

Figure 4:
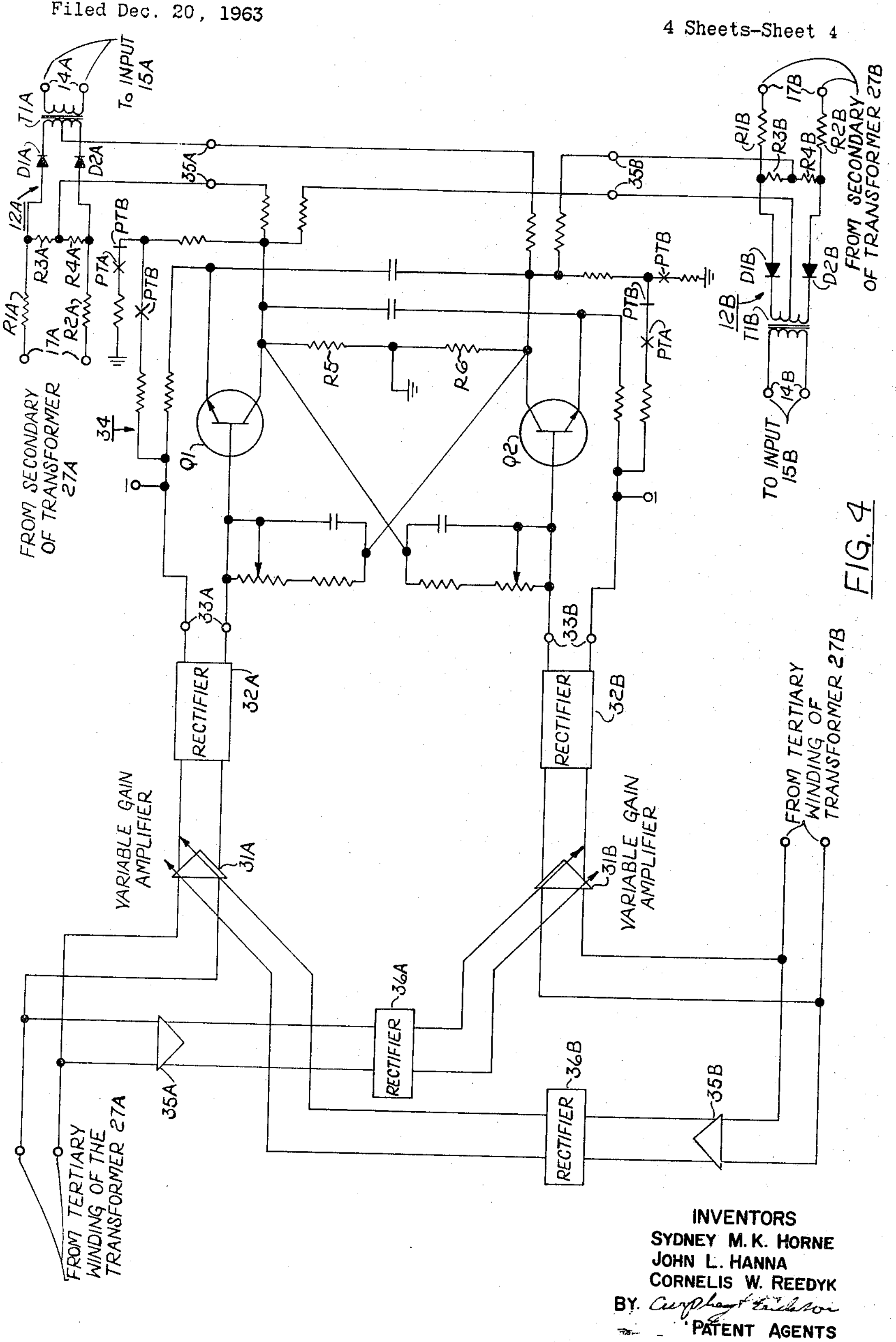
FIG. 4 is a partial block-schematic partial circuit-diagram showing the control signal generating means and the attenuation device in more detail.

Operation of the SA relay energizes the oscillator 16A and operates the PTB relay through make contacts of the SA relay. Operation of the PTB relay, as will be explained in more detail when FIG. 4 is described, overrides the response of the control signal generating means 28 to voice signals appearing at the tertiary of the transformers 27A and 27B and so conditions it such that attenuation devices 12A and 12B present maximum and minimum attenuation respectively. Thus, voice signals originating at the microphone 10A are prevented from being heard over the loudspeaker 11B while the oscillator 16A is transmitting a signal tone.

Relays A and B lock up under control of make contacts of the BK relay which thus serves to hold up the connection for the duration of a call.

Operation of relays A and B operate associated relays CA and CB. If the SS key has been released, relays L and LA would have released, but if not, relays L and LA are caused to release by the operation of the CA and CB relays. Operation of the CB relay releases the SA relay which is slow to release to permit a time duration of about 1½ seconds for the signal tone to be generated. Release of the SA relay disconnects the power supply from the oscillator 16A and releases the PTB relay. In the absence of any privacy features, hands-free intercommunication between stations A and B can begin.

*Signal calling privacy feature at station B*

If the PS switch at station B is in its first position, signal transmission from microphone 10B is prevented by the ground applied to the final stage of the preamplifier 25B. Also, ground is applied to switch blade PS–2 to hold the PTB relay operated over a phantom circuit between the secondary of the transformer 26B and the primary of the transformer 27B. Thus attenuation device 12A continues to present maximum attenuation and voice signals originating at microphone 10A are prevented from following the signal tone over the amplifier 13A to the loudspeaker 11B.

*Voice calling privacy feature at station B*

When the PS switch is in its second position, signal transmission from the microphone 10B is still prevented but the PTB relay is allowed to release and voice signal transmission is permitted from station A to station B.

*Hands-free calling feature at station B*

When the switch is in its third position, the switch blades PS–1 and PS–2 are open-circuited and, therefore, "hands-free" intercommunication can proceed.

*Override of privacy switch at station A*

The depression of the SS key at station A operates its associated AN relay which through its break contacts disconnects the preamplifier 25A and the PTA relay from its associated PS switch, thereby effectively placing this switch in its third or hands-free position. Once operated, the AN relay is held up through one of its make contacts and a make contact of the BK relay.

*Override of privacy switch at station B*

If the PS switch at station B is in its third or hands-free position, then upon hearing a signal tone over the loudspeaker 11B, a call can be answered by talking into the microphone 10B. However, if the PS switch is in its first or second position, then a call must be answered by momentarily depressing the ANS key. This operates the AN relay which locks up through one of its make contacts and a make contact of the BK relay. Operation of the AN relay disconnects the preamplifier 25B and the PTB relay from its associated PS switch as described above.

Operation of the PTT key at station A or B energizes relay PTA or PTB respectively to lock the generating means 28 in one condition, and operation of the PTL key at station A or B mutes microphone 10A or 10B, respectively.

*Release of a call at station A or B*

A call can be released at station A or B by momentarily depressing and then releasing its associated RLS key. Assume that a call is to be released at station B. Depression of the RLS key operates the RB relay which in turn operates the SR relay. Opeartion of the SR relay opens a holding path for the BK relay but this relay remains operated as long as the RB relay is operated.

Release of the RLS key releases the RB relay which causes the SR relay to release. But because the SR relay is slow to release, the BK relay releases. Release of the BK relay causes the A and B relays to release which in turn cause their associated CA and CB relays to release. With the A and B relays released, the connection between station A and station B will be released. With the BK relay released, the holding path for the AN relay at each station will be broken and this relay will release. Release of the AN relay at each station effectively returns the PS switch to its preselected position. In a similar manner, a call can be released at station A. If the RLS key is depressed at each station, the call will be released only upon release of the RLS key at both stations. This provides each station with means to keep a call connected by continuing to depress its RLS key.

A suitable control signal generating means 28 is described in patent mentioned above. However, a brief description of its operating principles will now be given with reference to FIG. 4. Voice signals from the tertiary winding of each transformer 27 are amplified in an associated variable gain amplifier 31, rectified in an associated rectifier 32 and applied to an associated input 33 of a bistable circuit shown as a multivibrator 34. Other suitable bistable circuits can be used such as fast acting miniature relays or reed relays. Voice signals from the tertiary of each transformer 27 are also amplified in an associated amplifier 35 and rectifed in an associated rectifier 36 to produce controlled attenuation for the variable gain amplifier 31 in the opposite direction of transmission. This control means for the amplifier 31 is provided to prevent signals that are fed back via acoustic coupling at one station from switching the state of the bistable circuit, thereby causing instability. This would happen when the attenuation in an amplifier was not sufficient to compensate for such acoustic coupling. The circuits can be advantageously arranged to permit switching of the multivibrator 34 only when one of the input signals applied thereto exceeds the other by a fixed ratio regardless of the absolute amplitude of the input signals as described in the above-mentioned patent. For example, the control signal produced by rectifier 36A is applied to the variable gain amplifier 31B. By suitable choice of gain for the amplifiers 35 and sensitivity to control by the amplifiers 31, the relative levels of the signals applied to the inputs 33A and 33B can be made dependent only on the ratio of the inputs to the microphones 10 of FIG. 2.

As shown in FIG. 4, each attenuation device 12 of FIG. 1 comprises a first pair of resistors R1, R2; a second pair of resistors R3, R4; a pair of diodes D1 and D2 and a transformer T1. The outputs 35A and 35B of the multivibrator 34 are connected between the junction of resistors R3 and R4 and the primary winding of the transformer T1 of each of attenuation devices 12A and 12B, respectively.

Assuming that the transistor Q1 is conducting and the transistor Q2 is non-conducting, the current through the collector load resistor R5 results in a negative voltage on the collector of the transistor Q1. Because the transistor Q2 is non-conducting, its collector will be approximately at ground potential. Therefore, diodes D1 and D2 of attenuation device 12B are forward biased and diodes D1 and D2 of attenuation device 12A are reverse biased. As a consequence, voice signals originating at microphone 10A (FIG. 2) are prevented from being heard over loudspeaker 11B because the attenuation produced is arranged to be equal to or greater than the gain of amplifier 13A. However, voice signals originating at microphone 10B are permitted to be heard over loudspeaker 11A because any attenuation produced is considerably less than the gain of amplifier 13B. If the signal level at the input 33A is sufficiently higher than the signal level at the input 33B, the multivibrator 34 will change its state, with transistor Q2 becoming conducting and transistor Q1 becoming non-conducting. The current through the collector load resistor R6 now results in a negative voltage on the collector of the transistor Q2 and because transistor Q1 is now non-conducting, its collector will be approximately at ground potential. Thus, the diodes D1 and D2 of the attenuation device 12A become forward biased and the diodes D1 and D2 of the attenuation device 12B become reversed biased.

When the PTA or PTB relay of FIG. 2 is operated, the response of the multivibrator 34 to the signal level at its inputs 33A and 33B is overridden by the make contacts of the PTA relay and the make and break contacts of the PTB relay. (See FIG. 4.) For example, when relay PTB is operated, ground is applied through one of its make contacts to the collector of the transistor Q2 and a negative potential is applied through another of its make contacts to the collector of the transistor Q1. This forward biases the diodes D1 and D2 of the attenuation device 12B and reverse biases the diodes D1 and D2 of the attenuation device 12A. Similarly, when the PTA relay is operated the diodes of the devices 12A and 12B become forward and reverse biased respectively. Break contacts of the PTB relay provide means for giving the PTB relay precedence over the PTA relay should they both be operated. This avoids any difficulties associated with the pressing of the PTT key at a calling station A when the PS switch at a called station B is in its first position.

In a case where the attenuation devices 12 are located at the output of their respective amplifiers 13, they could conveniently comprise fast acting relays which are responsive to high input signal levels.

Other features can advantageously be incorporated in an intercommunication system according to applicants' invention. For example, if privacy in talking is desired, a telephone handset can be arranged to be connected into the system as required in lieu of the microphone and loudspeaker. A call could be answered by lifting the handset by connecting a ground through the hook switch to the AN relay. Means can also be provided to integrate the handset with the intercommunication system so that it can be used with the regular telephone system or the intercommunication system. Push button keys are usually provided for selecting a called station. However, where the number of push buttons that can be accommodated by the station apparatus is limited, additional stations can be called by providing the dial of the handset with access to the intercommunication system switching equipment.

Thus, according to the present invention, a communication system has been provided which permits a signal tone to be transmitted over a voice communication channel to the loudspeaker of a station being called but prevents voice signals from being heard over the same loudspeaker until the call is answered. In addition, this invention has satisfied a need in hands-free intercommunication systems for two degrees of preselected privacy for a called station prior to the answering of a call. The answering of a call overrides the privacy feature for the duration of the call and the release of a call at either a calling or called station automatically resets the privacy feature.

What is claimed is:

1. A communication system comprising:
(a) a microphone and a loudspeaker;
(b) a voice communication channel arranged to connect the microphone to the loudspeaker;
(c) audible signal generating means connected to said channel to transmit a signal tone over said channel to the loudspeaker when said generating means is energized;
(d) electrical switching means arranged, when energized, to interconect the microphone, said channel and the loudspeaker, and to energize said generating means for a predetermined duration;
(e) control signal generating means for generating first and second predetermined control signals;
(f) said channel being connected to the control signal generating means and arranged to permit voice signals at the microphone to be heard over the loudspeaker via said channel when said first control signal is applied to said channel, and to prevent voice signals at the microphone from being heard over the loudspeaker via said channel when said second control signal is applied to said channel;
(g) and a privacy switch at the loudspeaker connected to the control signal generating means for conditioning the control signal generating means to apply a predetermined one or the other of said control signals to said channel.

2. A communication system as defined in claim 1 wherein the switching means includes means for conditioning the control signal generating means to apply said second control signal to said channel during the interval that the audible signal generating means is energized.

3. A communication system as defined in claim 2 wherein said channel comprises an attenuation device having an input and an output, and an amplifier having an input and an output; the output of the attenuation device being coupled to the input of the amplifier; the input of the attenuation device being connected to the microphone and the output of the amplifier being connected to the loudspeaker when the switching means is energized; the audible signal generating means being connected to the input of the amplifier; said control signals being applied to the attenuation device; the attenuation device being arranged to produce attenuation in an amount to permit voice signals at the microphone to be heard over the loudspeaker in response to said first control signal, and to produce attenuation sufficient to prevent voice signals at the microphone from being heard over the loudspeaker in response to said second control signal.

4. A communication system as defined in claim 3 wherein the amplifier is a fixed gain amplifier; and the attenuation device is arranged, in response to said first control signal, to produce attenuation in an amount less than or equal to the gain produced by said amplifier, and, in response to said second control signal, to produce attenuation in an amount greater than the gain produced by said amplifier.

5. A communication system as defined in claim 4 wherein the control signal generating means comprises a source of fixed potential, and polarity reversing means connected between said potential and the attenuation device for reversing the polarity of said potential; the polarity reversing means being responsive to the operation of said switch.

6. A communication system as defined in claim 5 including a transformer for coupling the switching means to the output of said amplifier; said switch being connected to the polarity reversing means via a phantom circuit between the loudspeaker and the secondary of the transformer.

7. A hands-free intercommunication system comprising:
(a) two stations, each having a microphone and a loudspeaker;
(b) a two-way voice communication channel having two paths one path arranged to interconnect the microphone of one station and the loudspeaker of the other station, and the other path arranged to interconnect the microphone of the other station and the loudspeaker of the one station;
(c) audible signal generating means connected to said one path of said channel to transmit a signal tone over said one path of said channel to the loudspeaker of the other station when said generating means is energized;
(d) electrical switching means arranged, when energized to interconnect said microphones and loudspeakers, and to energize said generating means for a predetermined duration;
(e) control signal generating means having two outputs and arranged to be responsive to the relative amplitudes of the voice signals origianting at each microphone to produce a first control signal at one output and a second control signal at the other output when the amplitude of the voice signal originating at the microphone associated with said one path exceeds the amplitude of the voice signal originating at the microphone associated with said other path by a predetermined amount, and vice-versa;
(f) said one path of said channel being connected to said one output and said other path being connected to said other output, said paths being arranged to permit voice signals to be heard over their associated loudspeaker only in response to said first signal;

(g) circuit means at each station connected to the control signal generating means and arranged, when energized, to override the response of the control signal generating means to the voice signals, and to so condition the control signal generating means to apply said first control signal to its output that is connected to the path of said channel associated with the microphone at the station having the energized circuit means, and to apply said second control signal to its output that is connected to the path of said channel associated with the loudspeaker at the station having the energized circuit means;

(h) a privacy switch at each station arranged to be connected to said circuit means through said switching means whenever the station is called, each said switch having first, second and third positions of operation, each said switch being arranged, when in its first position, to energize the circuit means and to prevent signal transmission from the microphone circuit at its associated station, each said switch being arranged, when in its second position, to prevent energization of the circuit means and to prevent signal transmission from the microphone circuit at its associated station, each said switch being arranged, when in its third position, to prevent energization of the circuit means and to permit signal transmission from the microphone circuit at its associated station;

(i) answering means at each station, arranged when operated at a station being called, to effectively place the switch at said called station in its third position; and (j) further means at each station, arranged when operated at a calling station, to effectively place the switch at said calling station in its third position.

8. An intercommunication system as defined in claim 7 wherein the control signal generating means includes control means to prevent one of said control signals from being produced when the amplitude of voice signals in one direction of transmission has already caused the control signal generating means to produce the other of said control signals, said one control signal being otherwise produced due to acoustic coupling between the loudspeaker in the path of said one direction of transmission and the microphone used for the opposite direction of transmission.

9. An intercommunication system as defined in claim 8 wherein the switching means includes means for energizing the circuit means associated with a station being called during the interval that the audible signal generating means is energized.

10. An intercommunication system as defined in claim 9 including release means under control of each station, arranged when operated, to deenergize the switching means thereby releasing the call, and to effectively return the privacy switch at each station to its preselected position.

11. An intercommunication system as defined in claim 10 including first coupling means for coupling each microphone to the switching means; and second coupling means for coupling the inputs of the paths of said channel to the switching means; each privacy switch being connected to the circuit means via a phantom circuit between said first and second coupling means.

12. An intercommunication system as defined in claim 11 wherein said first coupling means comprises a first pair of transformers, one at each station; said second coupling means comprises a second pair of transformers; the circuit means comprises a first pair of relays each having its energization circuit connected to the primary winding of one of the second pair of transformers, each privacy switch being arranged when in its first position to energize its associated relay; each of the first pair of relays being arranged through its contacts when energized, to override the response of the control signal generating means to the voice signals, and to so condition the control signal generating means to apply said second control signal to the path of said channel associated with the energized relay.

13. An intercommunication system as defined in claim 12 including means for preventing the relay of the first pair of relays which is associated with a calling station from being effective to override the response to the control signal generating means while the relay of the first pair of relays that is associated with a station being called is energized.

14. An intercommunication system as defined in claim 13 wherein the answering means comprises a non-locking answer key and an answer relay at each station, said answer key being arranged, when operated, to energize the answer relay, the answer relay being held operated, once energized, by one of its make contacts and a make contact of the switching means, the further means comprises a make contact associated with each station selection key, which is arranged when operated, to energize the answer relay, the answer relay being arranged through its contacts, when energized, to disconnect the privacy switch from its associated circuit means and from the microphone circuit.

15. An intercommunication system as defined in claim 14 wherein the release means comprises a non-locking key at each station, a third pair of transformers for coupling the outputs of said channel to the switching means, and a second pair of relays, each said release key being connected to an associated one of the second pair of relays via a phantom circuit between the loudspeaker and the secondary winding of one of the third pair of transformers, each said release key being arranged, when operated, to energize its associated relay, each of the second pair of relays being arranged, when energized, to prepare the switching means to release a call and to deenergize said answering means when both of said second pair of relays have become deenergized after at least one has been energized, each said release key being arranged when released to release its associated relay.

16. An intercommunication system as defined in claim 15 including a push-to-talk key at each station connected to the secondary winding of one of the second pair of transformers, and arranged when operated, to energize one of the first pair of relays.

17. An intercommunication system as defined in claim 16 including a push-to-listen key at each station connected across the microphone leads to attenuate signal transmission from the microphone.

18. An intercommunication system as defined in claim 17 wherein each path of said channel comprises an attenuation device having an input and an output, and a fixed gain amplifier having an input and an output, the output of each attenuation device being coupled to the input of an associated amplifier, the input of each attenuation device being connected to the secondary winding of an associated one of the first pair of transformers, the output of each amplifier being connected to the primary winding of an associated one of the third pair of transformers, the audible signal generating means being connected to the input of each said amplifier, each attenuation device being responsive to control signals applied by the control signal generating means.

19. An intercommunication system as defined in claim 9 wherein the switching means comprises first switching means responsive to the origination of a call at a calling station to connect said calling station to one side of said channel and the station being called to the other side of said channel, and second switching means responsive to said first switching means to energize the audible signal generating means and the circuit means for said predetermined duration.

20. An intercommunication system as defined in claim 18 wherein the control signal generating means comprises means for sensing the amplitudes of the voice signals appearing at the input of each attenuation device to produce signals proportional to the amplitudes of said voice signals; a bistable circuit being arranged to be responsive at its inputs to the signal of higher amplitude from said sensing means to switch its state of operation, said bistable circuit being arranged to produce said first control signal at one of its outputs and said second control signal at the other of its outputs when in its one state of operation and to produce said second control signal at one of its outputs and said first control signal at the other of its outputs when in its other state of operation, said attenuation devices being arranged to be responsive to the first or second control signal to provide minimum or maximum attenuation respectively of the voice signals appearing at its inputs, each of the first pair of relays being arranged, when energized, to lock said bistable circuit into a predetermined one of its states of operation.

21. An intercommunication system as defined in claim 20 wherein the system is arranged such that when one and the other attenuation device produce maximum and minimum attenuation respectively, or vice versa, the total loop gain from the microphone at one station, through the loudspeaker at the other station, including the acoustic coupling from said loudspeaker to the microphone at the other station and back to the loudspeaker at said one station is always less than unity; and when either attenuation device produces minimum attenuation, the gain from its associated microphone to its associated loudspeaker is substantially greater than unity.

22. An intercommunication system as defined in claim 21 wherein each attenuation device comprises first and second pairs of resistors, a pair of diodes and a further transformer, one resistor of the first pair being serially connected to an associated diode between the secondary winding of one of the first pair of transformers and the primary winding of the further transformer, the second pair of resistors being serially connected between the junctions of the diodes and first pair of resistors, the secondary of the further transformer being connected to the input of its associated amplifier, said control signals being applied to each attenuation device from the outputs of said multivibrator between the junction of the second pair of resistors and a center tap on the primary of the further transformer.

References Cited by the Examiner

UNITED STATES PATENTS

| | | | |
|---|---|---|---|
| 2,529,912 | 11/1950 | Campbell | 179—1.4 |
| 2,841,647 | 7/1958 | Blow | 179—1.4 |
| 3,146,313 | 8/1964 | Ulin | 179—1 X |

KATHLEEN H. CLAFFY, *Primary Examiner.*

R. P. TAYLOR, *Assistant Examiner.*